(12) United States Patent
Chien et al.

(10) Patent No.: US 8,077,777 B2
(45) Date of Patent: Dec. 13, 2011

(54) METHOD OF CONTROLLING COMPLEXITY FOR VIDEO COMPRESSOR

(75) Inventors: Ming-Chen Chien, Taichung County (TW); Pao-Chi Chang, Jung-Li (TW)

(73) Assignee: National Central University, Taoyuan County (TW)

( * ) Notice: Subject to any disclaimer, the term of this patent is extended or adjusted under 35 U.S.C. 154(b) by 1049 days.

(21) Appl. No.: 11/889,858

(22) Filed: Aug. 16, 2007

(65) Prior Publication Data
US 2008/0240249 A1    Oct. 2, 2008

(30) Foreign Application Priority Data
Mar. 28, 2007    (TW) ............................. 096110889 A (51) Int. Cl.
*H04N 7/12*     (2006.01)
*H04N 11/02*    (2006.01)
*H04N 11/04*    (2006.01)

(52) U.S. Cl. .............................. 375/240.17; 375/240.26

(58) Field of Classification Search ............. 375/240.17, 375/240.26
See application file for complete search history.

(56) References Cited

U.S. PATENT DOCUMENTS

| | | | | |
|---|---|---|---|---|
| 5,057,916 A | * | 10/1991 | Krause et al. | 375/240.12 |
| 2005/0047504 A1 | * | 3/2005 | Sung et al. | 375/240.2 |
| 2005/0058198 A1 | * | 3/2005 | Zhao et al. | 375/240.03 |
| 2005/0105612 A1 | * | 5/2005 | Sung et al. | 375/240.2 |
| 2005/0129121 A1 | * | 6/2005 | Sung | 375/240.16 |
| 2008/0181308 A1 | * | 7/2008 | Wang et al. | 375/240.16 |

* cited by examiner

*Primary Examiner* — Michael Pyzocha
*Assistant Examiner* — Jing Sims
(74) *Attorney, Agent, or Firm* — Jackson IPG PLLC; Demian K. Jackson (57) ABSTRACT

A video compressor has a real-time compression with a constant frame rate. The complexity in the compression of each frame is controlled to be smaller than a maximum value according to power management or compression time requirement. Delay jitter is eliminated. The present invention can be applied to MPEG-like video coding systems, such as H.264, MPEG4 and H.263.

13 Claims, 13 Drawing Sheets

| Compression tool | Coding effect |
|---|---|
| 16X16 MB partition mode | very high |
| 8X8 MB partition mode | middle |
| 16X8 MB partition mode | low |
| 8X16 MB partition mode | low |
| under-8X8 MB partition mode | low |
| half pixel ME | very high |
| 1/4 pixel ME | high |
| transformation (DCT | very high |
| entropy coding | very high |
| deblocking filtering | high |
| coding with five reference frames | very low |

31 — 16X16 MB partition mode
32 — (8X8 through 1/4 pixel ME)
33 — transformation (DCT
34 — entropy coding
35 — deblocking filtering
36 — coding with five reference frames

| Frame rate | ME levels (low mid high) | Video quality |
|---|---|---|
| 30 | (30 20 00) | |
| 30 | (31 30 20) | |
| 30 | (N/A 30 20) | |
| 30 | (N/A 31 30) | |
| 30 | (N/A 32 31) | |
| 25 | (30 20 00) | |
| 25 | (31 30 20) | |
| 25 | (N/A 30 20) | |
| 25 | (N/A 31 30) | |
| 25 | (N/A 32 31) | |
| 20 | (30 20 00) | |
| 20 | (31 30 20) | |
| 20 | (N/A 30 20) | |
| 20 | (N/A 31 30) | |
| 20 | (N/A 32 31) | |
| 15 | (30 20 00) | |
| 15 | (31 30 20) | |
| 15 | (N/A 30 20) | |
| 15 | (N/A 31 30) | |
| 15 | (N/A 32 31) | |

METHOD OF CONTROLLING COMPLEXITY FOR VIDEO COMPRESSOR

FIELD OF THE INVENTION

The present invention relates to controlling compression complexity; more particularly, relates to eliminating delay jitter on compressing video frames, controlling complexity according to power management or compression time requirement, and thus obtaining a real-time compression with constant frame rate for a video compressor.

DESCRIPTION OF THE RELATED ARTS

As communication needs grow, video systems are widely used, such as the systems for the Internet and wireless communications. In general, a real-time video processing is an essential issue in a video system. Hence, efforts are laid on how to compress video effectively with less distortion.

Now, 64 Kbps of H.261 is used as a low-bandwidth compression standard, like ISDN. Yet, H.263 provides a standard of video coding for a very low bandwidth below 64 Kbps in hope of a transmission over telephone line network. All these standards omit some frames to transmit digital video signals under limits of their media. That is to say, in a low or very low bandwidth transmission, like through ISDN or the telephone line network, frames of the video are compressed and partly omitted.

Owing to transmission media or bandwidth limits, the compressed video may need compression rate transformation. To conquer a bandwidth limit, it is quite often to compress a frame but omit several frames. Yet, motion vectors of the omitted frames may become function less because of no reference frame. At his time, the transmitted video data may be decompressed or decoded by comparing motion vectors between the transmitted frames.

Figure 12:
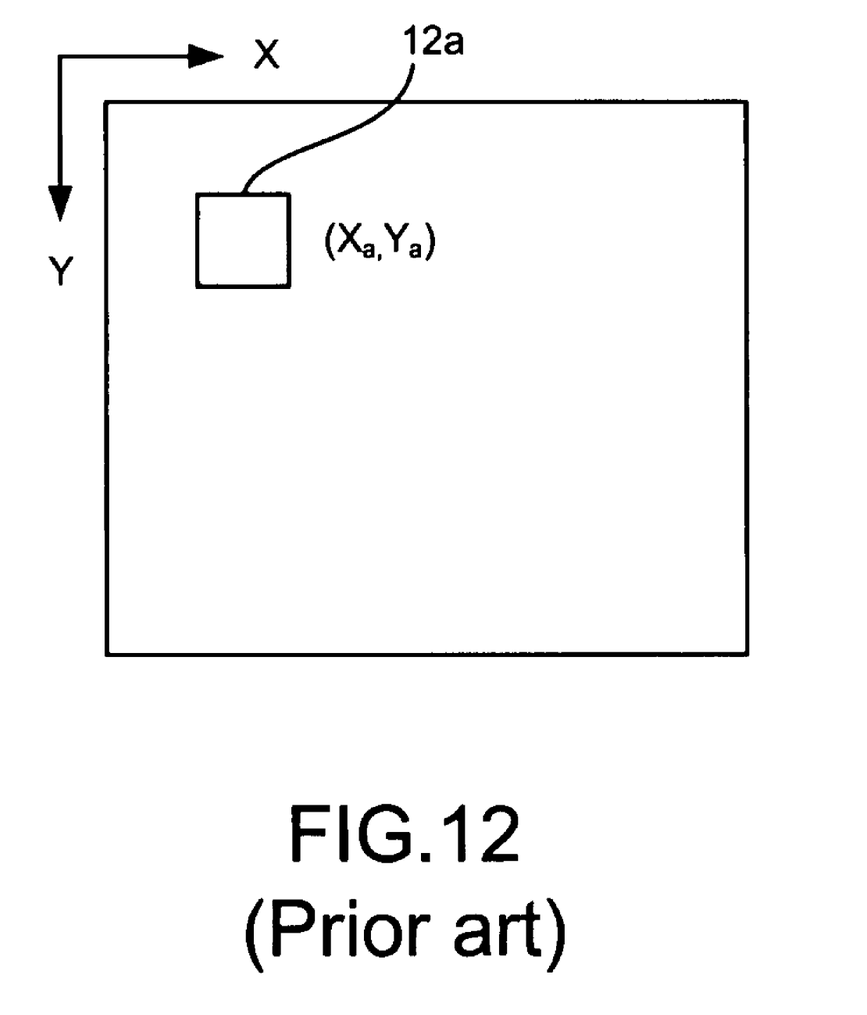
FIG. 12 and FIG. 13 are the views of the general motion vector.
Figure 13:
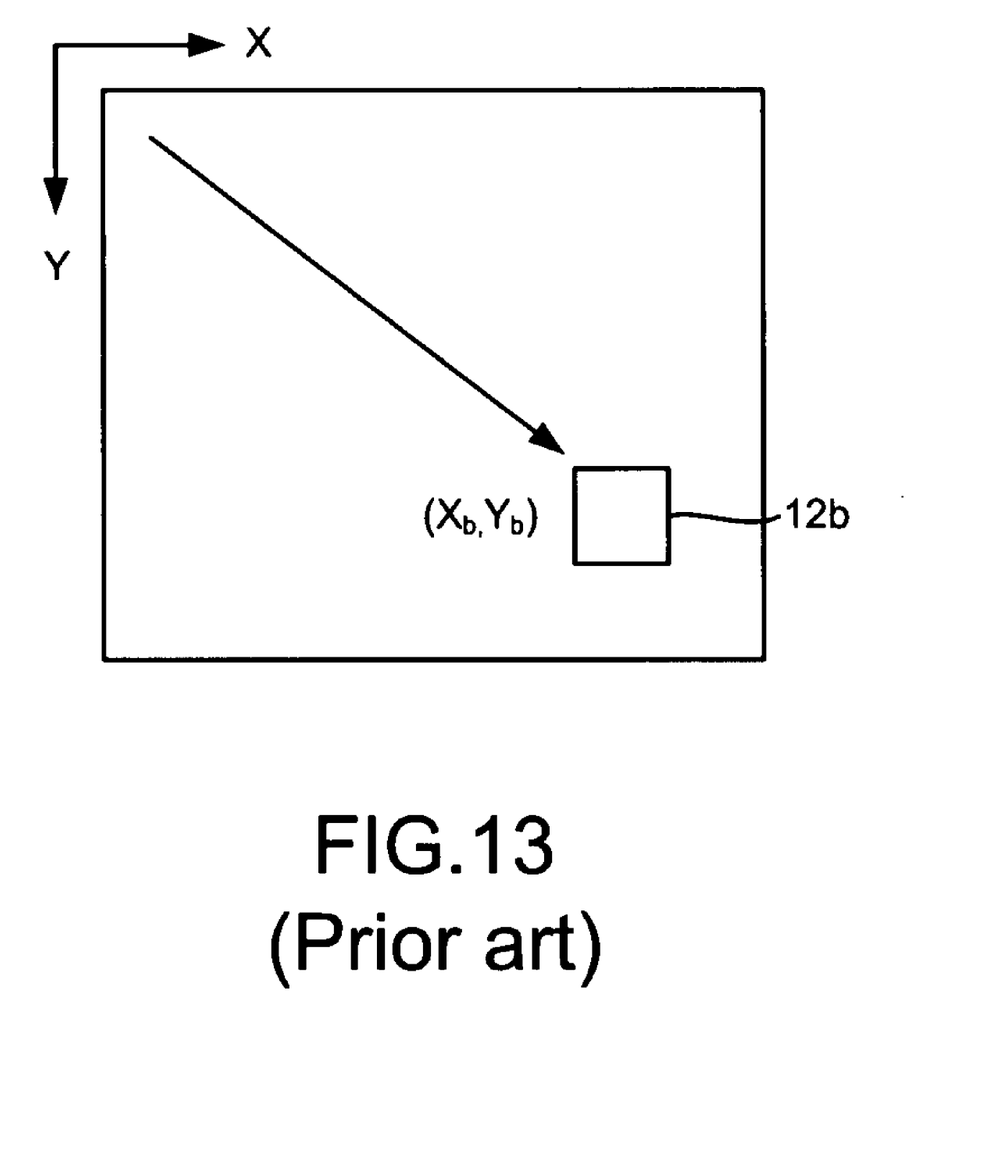

As shown in FIG. 12 and FIG. 13, a first block 12b having coordinates of $(X_b, Y_b)$ is a current block; and a second block 12a having coordinates of $(X_a, Y_a)$ is a block in previous frame which is most similar to the first block. Thus, coordinates differences between the first block and the second block $[(X_a, Y_a)-(X_b, Y_b)]$ are the motion vector.

A prior art of U.S. Pat. No. 5,057,916, "Method and Apparatus for Refreshing Motion Compensated Sequential Video Images", has an algorithm of block matching motion estimation. By using the prior art, a motion vector is figured out by finding a most similar block in previous frame. However, the sampling method for figuring out the motion vector requires time for a great amount of computation on comparing frames. Thus, it is not good for a real-time transformation on compression rate or coding rate.

Take MPEG video compression as an example. A current frame is separated into 16×16 blocks, where each block Ci has a corresponding search area in previous frame. By using a search algorithm, a most similar block Si is found in the search area and thus a motion vector between the two blocks is decided. Normally, the most used comparison method is done by a sum of absolute difference (SAD), whose formula is:

$$SAD = \sum_{Y=0}^{15} \sum_{x=0}^{15} |Si(x, y) - Ci(x, y)|$$

Therein, Si(X,Y) and Ci(X,Y) are pixel data of Si and Ci. By finding a minimum sum of the absolute differences, a corresponding block Si for the current block Ci is decided. Nevertheless, 256 times of addition containing 256 times of subtraction have to be done. This does not reduce the time spent for obtaining the motion vector; and the overhead spent for complexity control is big. Hence, the prior arts do not fulfill all users' requests on actual use.

SUMMARY OF THE INVENTION

The main purpose of the present invention is to control a complexity of encoding each frame below a maximum value for optimizing quality and to eliminate delay jitter on compressing frames.

Another purpose of the present invention is to obtain a small overhead for a real-time compression.

To achieve the above purposes, the present invention is a method of con trolling a complexity for a video compressor, comprising steps of: (i) processing an off-line complexity analysis to a video compression system to obtain coding gains of compression tools separately; (ii) arranging a motion estimation (ME) flow with a result from the complexity analysis; (iii) obtaining a best combination of a frame rate and ME levels of each frame with a maximum complexity through an iteration method; (iv) allocating the maximum complexity to each MB properly; and (v) checking the distributed complexity after finishing the ME levels, where a complexity for encoding the frame is controlled below a maximum value for optimizing a frame compression quality and eliminating delay jitter on compressing frames; the complexity is controlled according to power management or compression time requirement; and thus a real-time compression is obtained with constant frame rate for a video compressor. Accordingly, a novel method of controlling a complexity for a video compressor is obtained.

BRIEF DESCRIPTION OF THE DRAWINGS

The present invention will be better understood from the following detailed description of the preferred embodiment according to the present invention, taken in conjunction with the accompanying drawings, in which.

DESCRIPTION OF THE PREFERRED EMBODIMENT

The following description of the preferred embodiment is provided to understand the features and the structures of the present invention.

Figure 1:
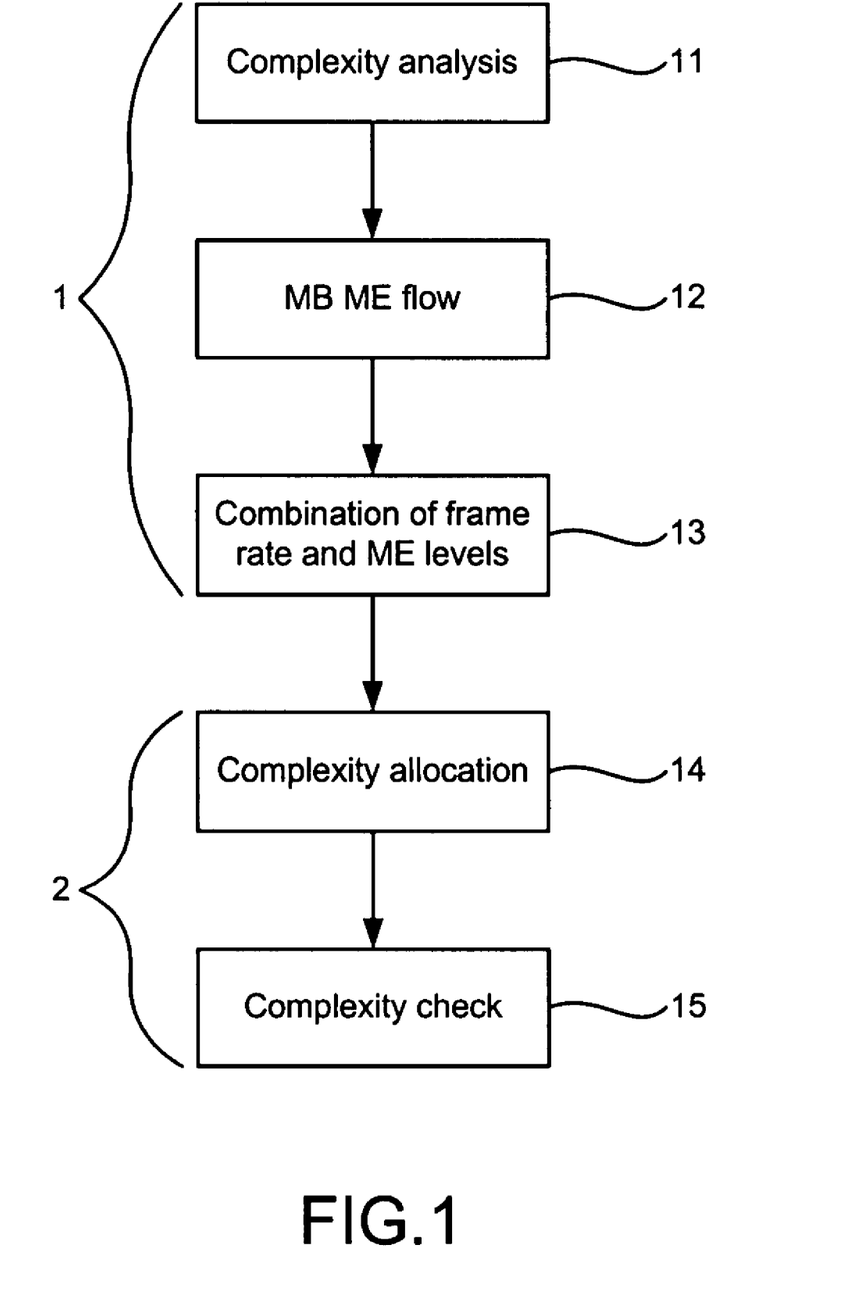
FIG. 1 is the flow view showing the preferred embodiment according to the present invention.

Please refer to FIG. 1, which is a flow view showing a preferred embodiment according to the present invention. As shown in the figure, the present invention is a method of controlling a complexity for a video compressor, comprising the following steps:

(a1) Complexity analysis 11: A video compression system is processed with a complexity-rate-distortion analysis to obtain coding gains of compression tools in the video compression system. The video compression system can be an H.264 system, an MPEG4 system or an H.263 system.

(a2) MB ME flow 12: According to a result of the complexity analysis 11, motion estimations (ME) of every macro block (MB) is arranged, where compression tools are sorted from a high coding-gain tool to a low coding-gain tool.

(a3) Combination of frame rate and ME levels 13: A video clip is tested with various combinations of a frame rate and ME levels through an iteration method coordinated with a complexity allocation and a complexity control to find a best combination. A maximum complexity of a frame (Cfmax) is obtained with the frame rate for the best combination. And the best combinations of frame rates and ME levels for different systems having different working frequencies are figured out to obtain a table. The above three steps of step (a1), step (a2) and step (a3) are a "beforehand analysis" 1, which are done off-line or on designing a system.

(a4) Complexity allocation 14: The Cfmax is then properly distributed to every MB for a video coding level of the MB; and then is further distributed to the ME.

(a5) Complexity control 15: A complexity is checked after finishing ME at the level. If a used complexity is smaller than a distributed complexity, ME of the next level continues; or else, ME is stopped. The above two steps of step (a4) and step (a5) are "on-line control" 2, which are done in a real-time compression.

Figure 2:
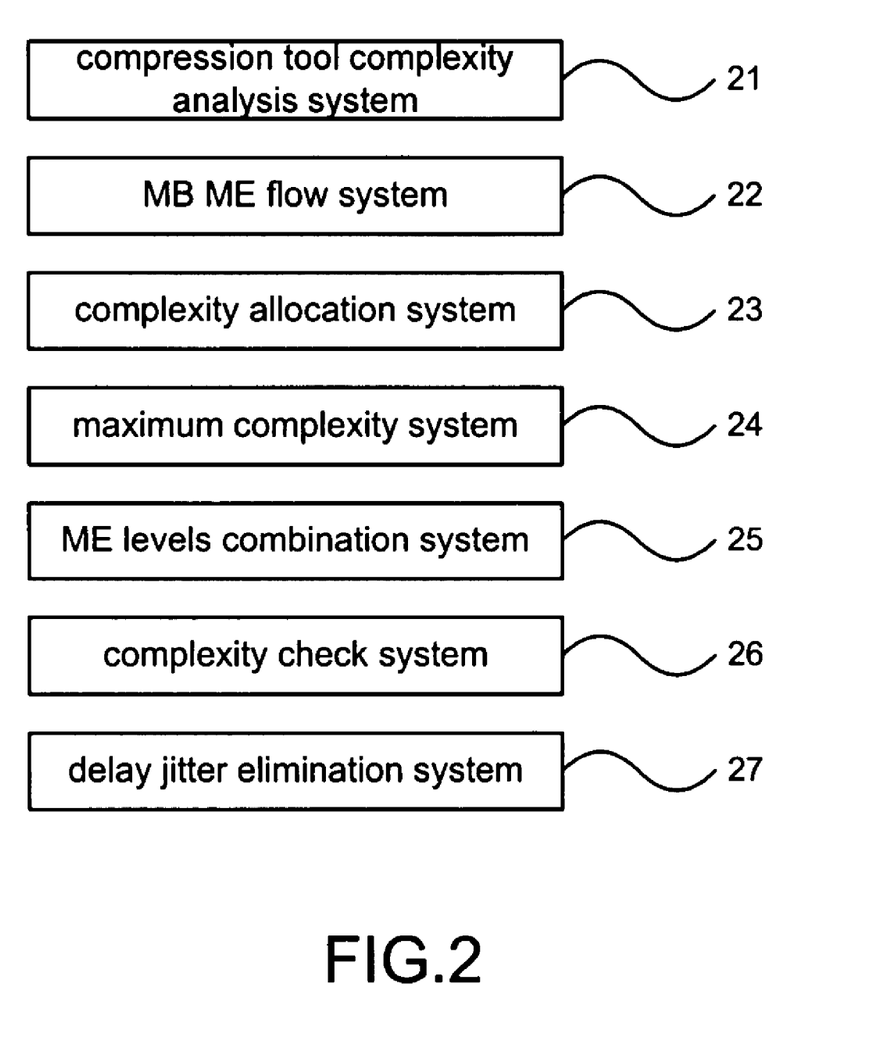
FIG. 2 is the view showing the systems of the preferred embodiment.

Please refer to FIG. 2, which is a view showing systems of the preferred embodiment. As shown in the figure, the present invention is a method of controlling a complexity for a video compressor, comprising the following systems: i) a compression tool complexity analysis system 21, which tests a video compression system to obtain an effect of each compression tool; ii) an MB ME flow system 22 to arrange compression tools from one having a high coding efficiency to one having a low coding efficiency; iii) a complexity allocation system 23 to distribute a complexity of a frame to each MB, to balance the complexity after encoding the MB and allocating balanced complexity to the rest MBs; iv) a maximum complexity system 24 and an ME levels combination system 25 to obtain a best combination of a frame rate and ME levels; v) a complexity check system 26 to check a complexity after each ME level; vi) and a delay jitter elimination system 27 to control a time for encoding the frame below 1/f second, where f is a frame rate per second.

With the above structure, a complexity for encoding each frame is controlled below a maximum value. The complexity of each frame is allocated to high-efficiency compression tools for optimizing compression quality. Thus, the present invention controls the complexity according to power management or compression time requirement, and obtains a real-time compression with constant frame rate for a video compressor.

Figure 3:
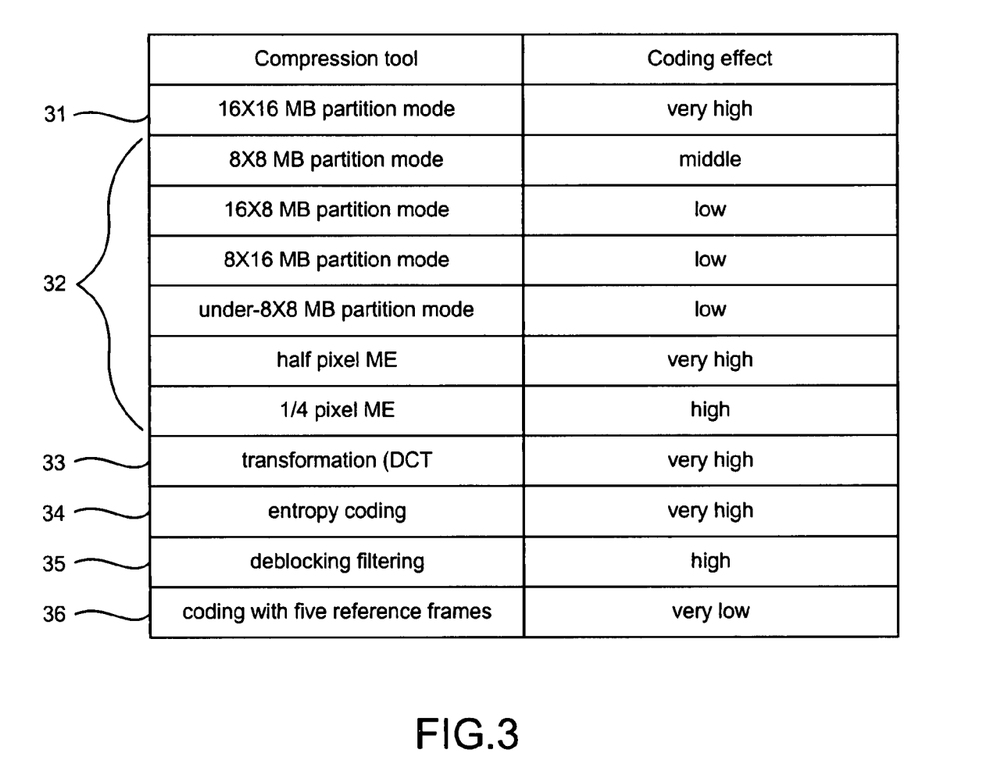
FIG. 3 is the view showing the complexity analysis.

Please refer to FIG. 3, which is a view showing a complexity analysis. As shown in the figure, a compression tool complexity analysis system processes a complexity analysis to compression tools of a video compression system. In the complexity analysis, an H.264 system compresses a video clip to obtain effects of the present invention on the compression tools. The analysis result includes increased complexities ($\Delta C$), a reduced distortion ($\Delta D$) and a lessened rate ($\Delta R$). A reduced cost ($\Delta J$) is obtained from $\Delta D$ plus $\Delta R$ multiplied with a value ($\lambda$) through a formula of $\Delta J=\Delta D+\lambda\Delta R$. The $\Delta J$ is divided by $\Delta C$ to obtain coding gains (CG) through a formula of $CG=\Delta J/\Delta C$. Therein, $\lambda$ is assigned by ME of H.264. Or, the rate of a frame is controlled to be a reasonable value to make $\Delta R$ become zero; and thus $\Delta J$ equals to $\Delta D$.

At first, compression tools having high compression rates are reserved, such as a full pixel ME of a 16×16 MB partition mode 31, a discrete cosine transformation (DCT) 33, an entropy coding 34 and a deblocking filtering 35. Compression tools having middle and low compression rates 32 are analyzed through the above method and are sorted from one having higher compression rates to one having lower compression rates. And the compression tool having the lowest compression rate is omitted, like coding with five reference frames 36. In the other hand, the compression tools having middle and low compression rates 31,33,34,35 are analyzed through the above method to obtain reasonable complexity values from maximum result values, including maximum reserved values for processes after encoding all slices, all MBs, and the ME.

Figure 4:
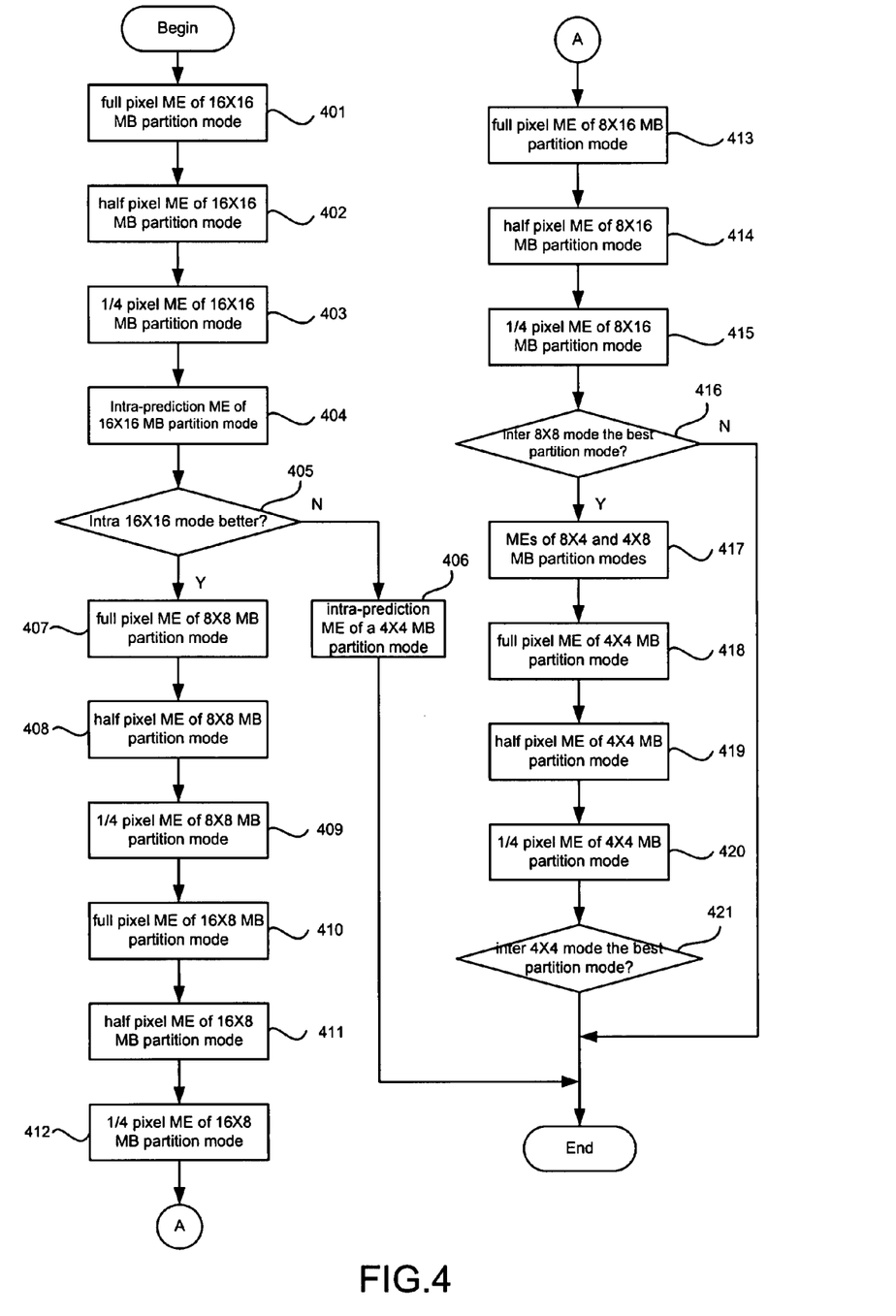
FIG. 4 is the flow view showing the ME.

Please refer to FIG. 4, which is a flow view showing ME. As shown in the figure, an MB ME flow system utilizes sorted compression tools to obtain a minimum cost and a best partition mode, comprising the following steps:

(b1) A full pixel ME of a 16×16 MB partition mode 401: A full pixel ME is processed in a 16×16 MB partition mode.

(b2) A half pixel ME of a 16×16 MB partition mode 402: A half pixel ME is processed in a 16×16 MB partition mode.

(b3) A ¼ pixel ME of a 16×16 MB partition mode 403: A ¼ pixel ME is processed in a 16×16 MB partition mode, where a minimum cost is set to be a result of this step and a best partition mode is set to be an inter 16×16 mode.

(b4) An Intra-prediction ME of a 16×16 MB partition mode 404: An Intra-prediction ME is processed in a 16×16 MB partition mode.

(b5) A comparison for intra 16×16 mode 405: If the result of step (b4) is greater than or equal to the existing minimum cost, directly go to step (b7). Or else, the minimum cost is reset to be a result of step (b4) and the best partition mode an intra 16×16 mode.

(b6) An intra-prediction ME of a 4×4 MB partition mode 406: An Intra-prediction ME is processed in a 4×4 MB partition mode. If a result of this step is smaller than the existing minimum cost, the minimum cost is reset to be the result of this step and the best partition mode an intra 4×4 mode. Then ME ends.

(b7) A full pixel ME of an 8×8 MB partition mode 407: A full pixel ME is processed in an 8×8 MB partition mode.

(b8) A half pixel ME of an 8×8 MB partition mode 408: A half pixel ME is processed in an 8×8 MB partition mode.

(b9) A ¼ pixel ME of an 8×8 MB partition mode 409: A ¼ pixel ME is processed in an 8×8 MB partition mode. If a result of this step is smaller than the existing minimum cost, the minimum cost is reset to be the result of this step and the best partition mode an inter 8×8 mode.

(b10) A full pixel ME of a 16×8 MB partition mode 410: A full pixel ME is processed in a 16×8 MB partition mode.

(b11) A half pixel ME of a 16×8 MB partition mode 411: A half pixel ME is processed in a 16×8 MB partition mode.

(b12) A ¼ pixel ME of a 16×8 MB partition mode 412: A ¼ pixel ME is processed in a 16×8 MB partition mode. If a result of this step is smaller than the existing minimum cost, the minimum cost is reset to be the result of this step and the best partition mode an inter 16×8 mode.

(b13) A full pixel ME of an 8×16 MB partition mode 413: A full pixel ME is processed in an 8×16 MB partition mode.

(b14) A half pixel ME of an 8×16 MB partition mode 414: A half pixel ME is processed in an 8×16 MB partition mode.

(b15) A ¼ pixel ME of an 8×16 MB partition mode 415: A ¼ pixel ME is processed in an 8×16 MB partition mode.

(b16) A check of inter 8×8 mode as the best partition mode 416: If the best partition mode is not the inter 8×8 mode, the ME process is stopped; or else, the following step continues.

(b17) ME of an 8×4 and a 4×8 MB partition modes 417: ME are processed in an 8×4 and a 4×8 MB partition modes.

(b18) A full pixel ME of a 4×4 MB partition mode 418: A full pixel ME is processed in a 4×4 MB partition mode.

(b19) A half pixel ME of a 4×4 MB partition mode 419: A half pixel ME is processed in a 4×4 MB partition mode.

(b20) A ¼ pixel ME of a 4×4 MB partition mode 420: A ¼ pixel ME is processed in a 4×4 MB partition mode.

(b21) A check of inter 4×4 mode as the best partition mode 421: If a result cost of step (b20) is smaller than or equal to the existing minimum cost, the minimum cost is reset to be the result of step (b20) and the best partition mode an inter 4×4 mode.

Figure 5:
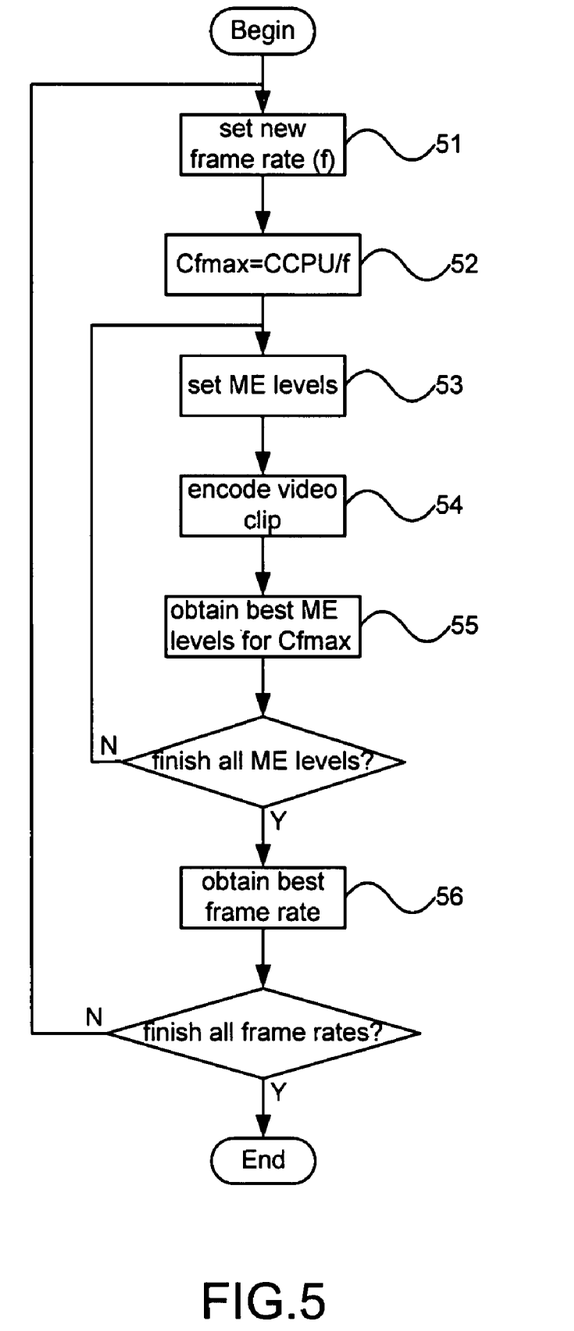
FIG. 5 is the flow view showing the process of finding the best combination of frame rate and ME levels.
Figure 6:
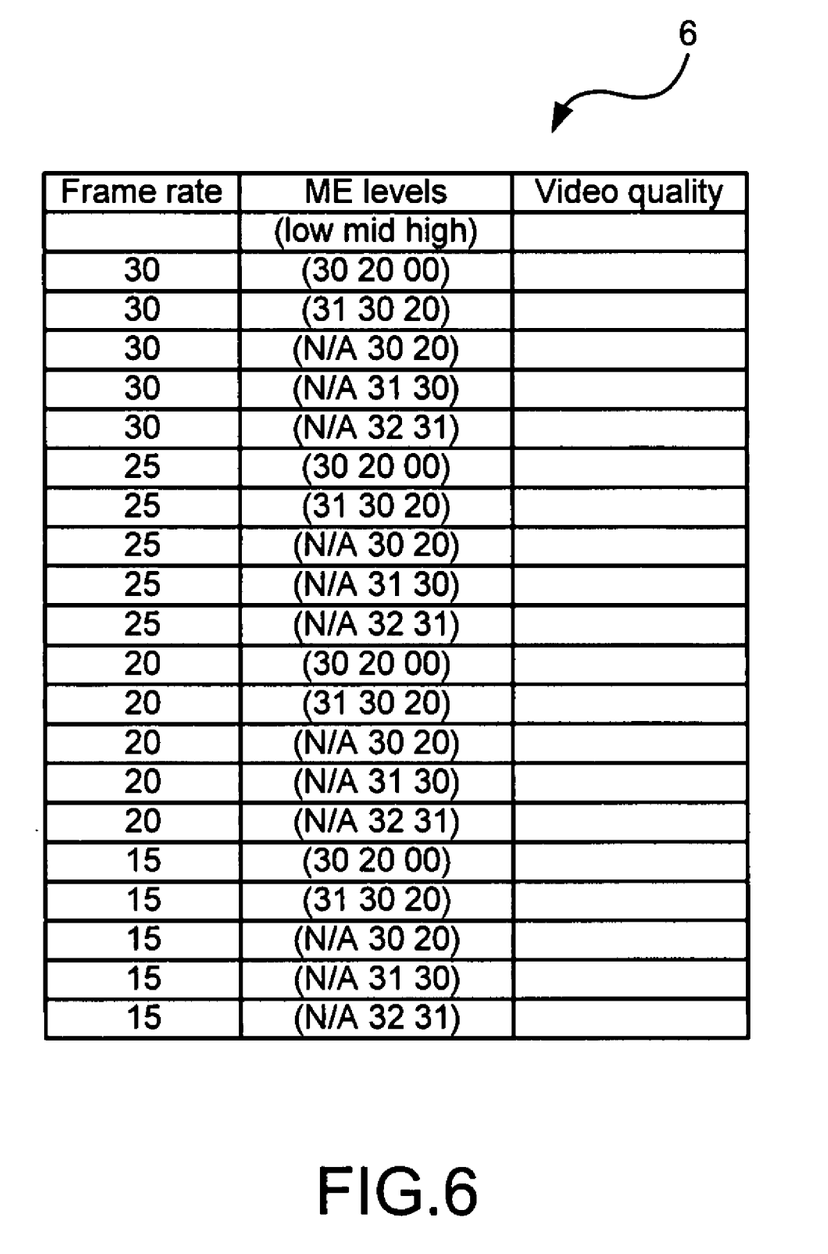
FIG. 6 is the view showing the frame qualities of the combinations of frame rate and ME levels.

Please refer to FIG. 5 and FIG. 6, which are a flow view showing a process of finding the best combination of frame rate and ME levels; and a view showing frame qualities of the combinations of frame rates and ME levels. As shown in the figures, for various central processing units (CPU), there are various combinations of best maximum complexities and ME levels of a frame for obtaining best compression qualities. At first, a new frame rate (f) is set 51 to obtain a maximum complexity of a frame by dividing a frequency of a CPU (CCPU) with f through a formula of Cfmax=CCPU/f 52. Then a video clip is encoded 54 with various ME levels 53. Another frame rate is selected to be processed with the above procedure for obtaining a best frame rate 56 with a corresponding maximum complexity (Cfmax) and ME levels 55. And the results during the above procedure are made into a table 6. With the Cfmax and its corresponding ME levels, a complexity for encoding a video on-line is under control. Besides, if there is a rate limit, the coding rate should be controlled. Thus, the present invention successfully controls complexity and makes actual distortion using the present invention much closer to the original distortion without complexity constraint; and the coding rate has little increase.

Figure 7:
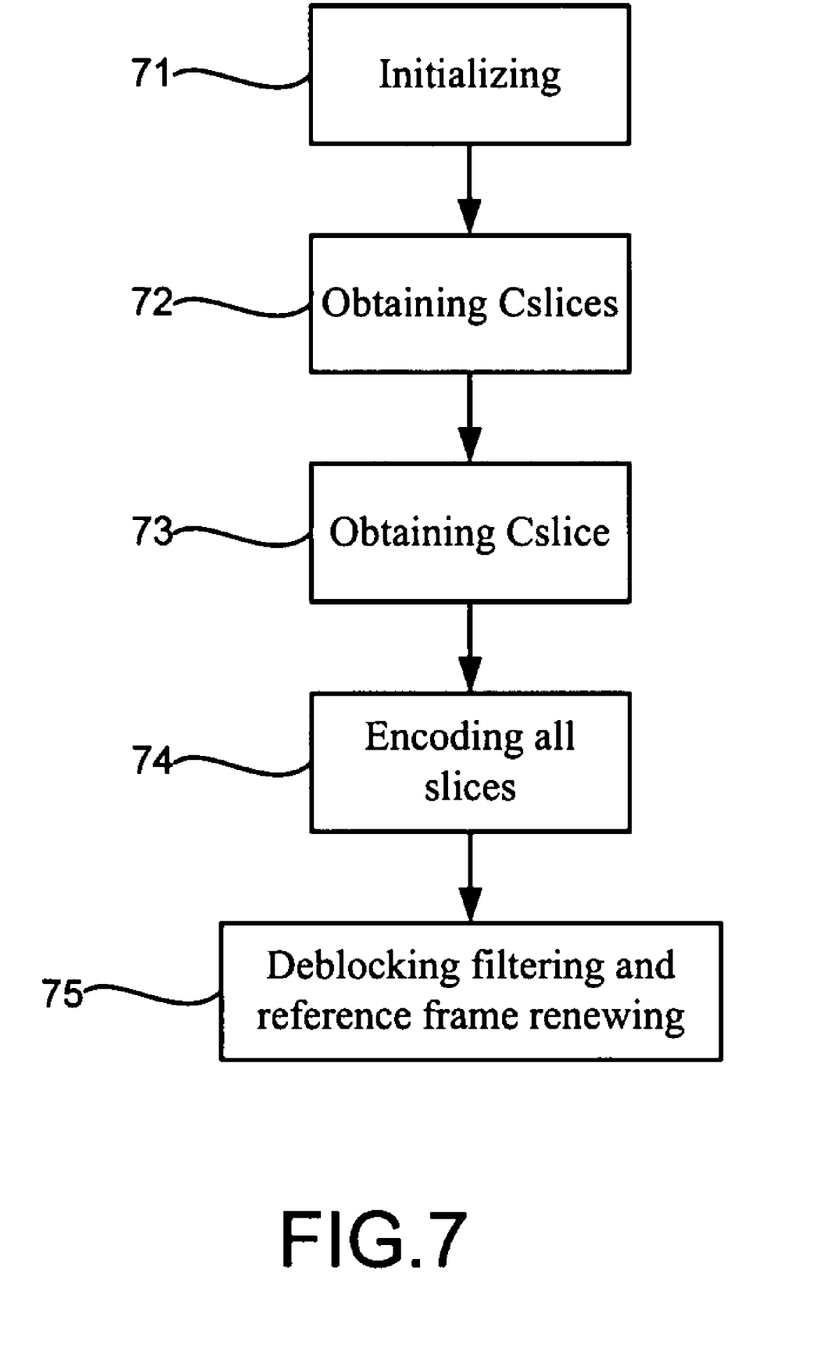
FIG. 7 is the flow view showing encoding the frame.

Please refer to FIG. 7, which is a flow view showing encoding a frame. As shown in the figure, H.264 encodes a frame with a complexity allocation system, comprising the following steps:

(c1) Initializing 71: Before encoding all slices of a frame, a used initial complexity of the frame (Cfinit) is fetched and a complexity required for processes after encoding all slices (Cfrsv) is reserved (c2) Obtaining Cslices 72: A maximum complexity of the frame (Cfmax) is subtracted with Cfinit and Cfrsv to obtain a maximum complexity of all slices (Cslices) through a formula of Cslices=Cfmax−Cfinit−Cfrsv.

(c3) Obtaining Cslice 73: The Cslices is evenly allocated to all slices to obtain an average slice complexity (Cslice) by dividing the Cslices by a number of slices (Nslice) through a formula of Cslice=Cslices/Nslice.

(c4) Encoding all slices 74.

(c5) Processing deblocking filtering and reference frame renewing 75.

Therein, the Cfrsv is reserved to process de blocking filtering and reference frame renewing in step (c5).

Figure 8:
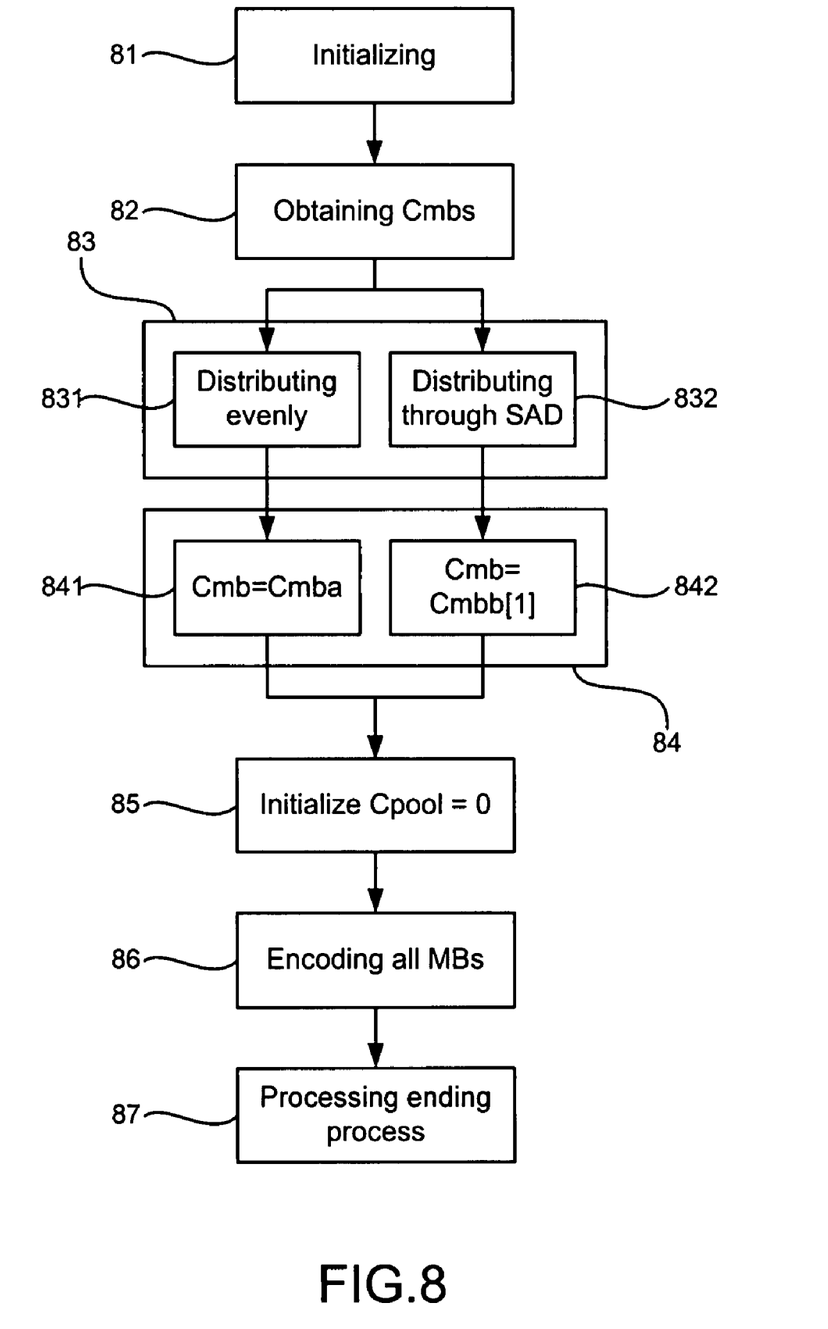
FIG. 8 is the flow view showing encoding the slice.

Please refer to FIG. 8, which is a flow view showing encoding a slice. As shown in the figure, H.264 encodes a slice, comprising the following steps:

(d1) Initializing 81: A used initial complexity of all MBs of the slice (Csinit) is fetched; and a complexity for all processes after encoding all MBs (Csrsv) is reserved.

(d2) Obtaining Cmbs 82: A maximum complexity of the slice (Cslice) is subtracted with Csinit and Csrsv to obtain a maximum complexity of all MBs (Cmbs) through a formula of Cmbs=Cslice−Csinit−Csrsv.

(d3) Allocating Cmbs to all MBs 83: The Cmbs is allocated to all MBs in one of the following two ways:

(d31) Allocating evenly 831: The Cmbs is evenly allocated to every MB to obtain an average MB complexity (Cmba) by dividing the Cmbs by a number of the MBs (Nmb) through a formula of Cmba=Cmbs/Nmb.

(d32) Allocating through SAD0 832: Or, the Cmbs is allocated to every MB through a weight of sum of absolute difference (SAD) to be compared with the previous frame with zero motion vector (MV) in 16×16 partition mode (SAD0) to obtain a default complexity of each MB (Cmbb) through a formula of $$Cmbb[i] = Cmbs * \frac{SAD0[i]}{\sum_{j=1}^{M} SAD0[j]}$$

$$i = 1, 2, \ldots M,$$

or a similar formula.

(d4) Obtaining Cmb 84: A maximum complexity of the first MB (Cmb) is obtained in one of the following two ways:

(d41) Setting Cmb with Cmba 841: If the Cmbs is evenly allocated, the Cmb is set with Cmba through a formula of Cmb=Cmba.

(d41) Setting Cmb with Cmbb[1] 842: If the Cmbs is allocated through the weight of SAD, the Cmb is set with a default complexity of the first MB (Cmbb[1]) through a formula of Cmb=Cmbb[1].

Figure 9:
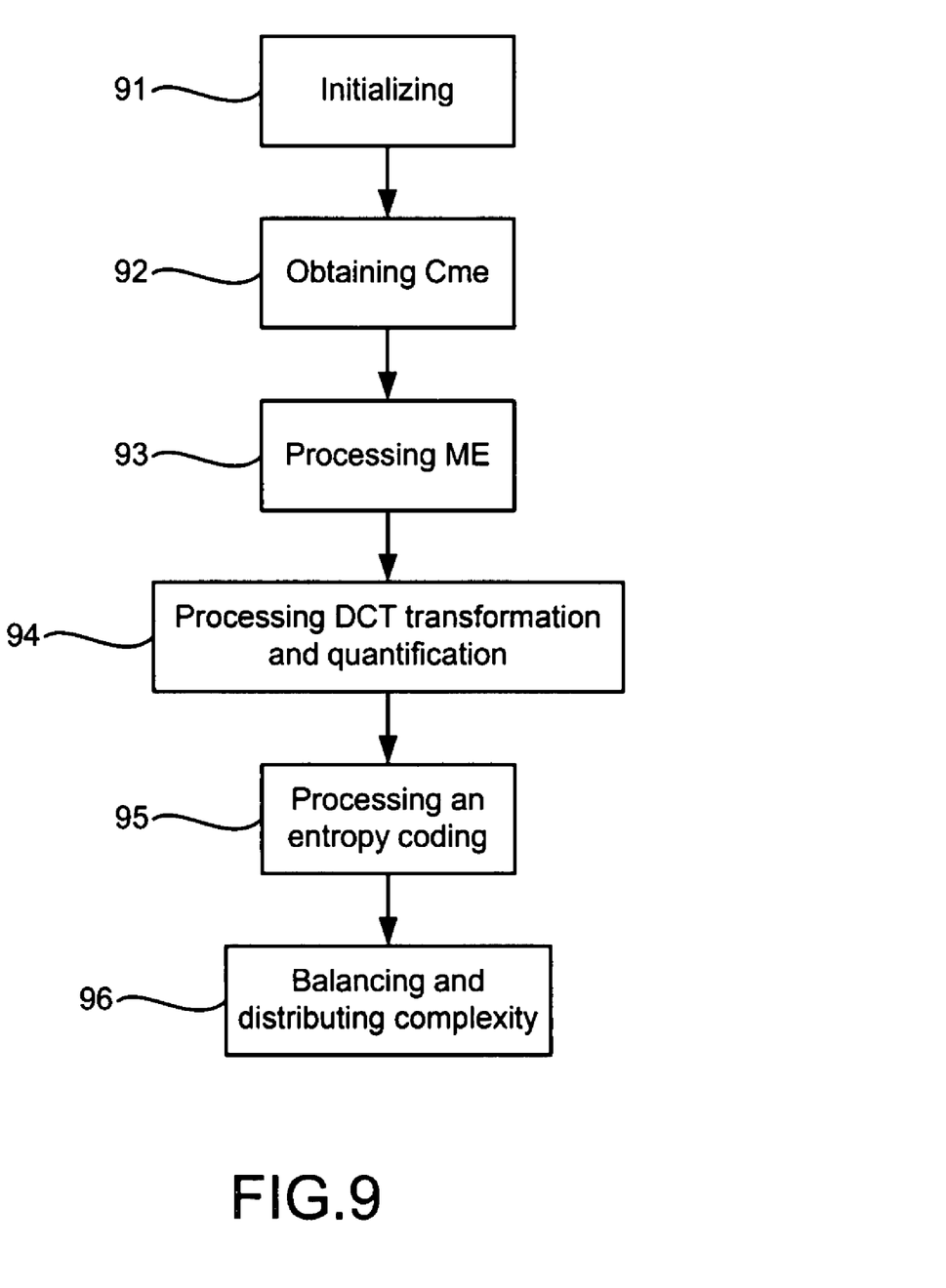
FIG. 9 is the flow view showing encoding the MB.

(d5) Initializing Cpool with zero 85: A complexity Cpool which will be used in step (e6) as shown in FIG. 9 is initialized to zero.

(d6) Encoding all the MBs 85.

(d7) Processing an ending process 86.

There in the Csrsv is reserved to process the ending process in step (d6).

Please refer to FIG. 9, which is a flow view showing encoding an MB. As shown in the figure, H.264 encodes an MB, comprising the following steps:

(e1) Initializing 91: Before processing ME of an MB, a used complexity of MB (Cmbinit) is fetched and a complexity required for processes after processing ME of the MB is reserved.

(e2) Obtaining Cme 92: A maximum complexity of the MB (Cmb) is subtracted with Cmbinit and Cmbrsv to obtain a maximum complexity of ME (Cme) through a formula of Cme=Cmb−Cmbinit−Cmbrsv.

(e3) Processing the ME 93.

(e4) Processing a discrete cosine transformation (DCT) and quantification 94.

(e5) Processing an entropy coding 95.

(e6) Balancing and allocating complexity used in encoding the MB 96,

Therein, the Cmbrsv is reserved to process a DCT transformation and quantification and an entropy coding in step (e4) and step (e5).

Figure 10:
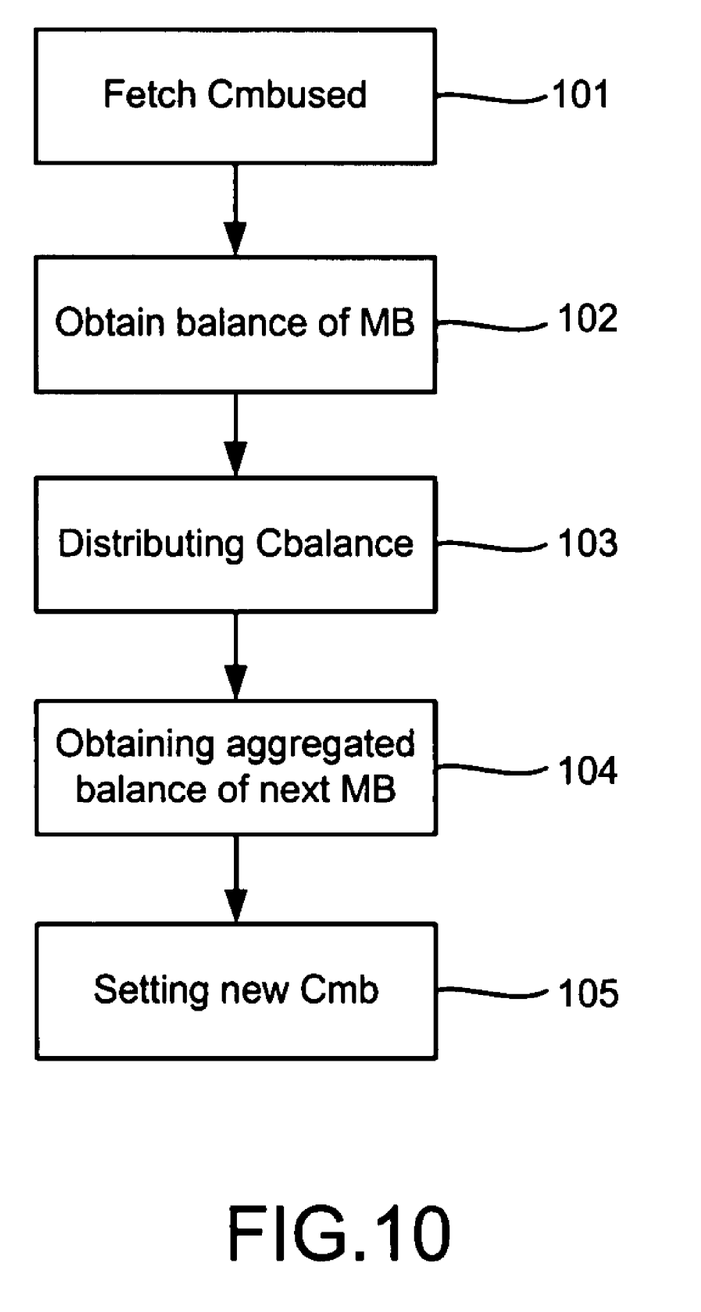
FIG. 10 is the flow view showing balancing and allocating the complexity.

Please refer to FIG. 10, which is a flow view showing balancing and allocating a complexity. As shown in the figure, after encoding each MB, a complexity used in encoding the MB is balanced and allocated, comprising the following steps:

(f1) Fetching Cmbused 104: After finishing all encoding processes of each MB, a complexity used in encoding the MB is fetched.

(f2) Obtaining a balance of the MB 105: Then the Cmb is subtracted with the Cmbused to obtain a balance of the MB (Cbalance) through a formula of Cbalance=Cmb−Cmbused.

(f3) Allocating Cbalance 106: The Cbalance is allocated evenly to all yet-encoded MBs to obtain an allocated complexity (Cbouns[i]) from this MB to a number (Nmbleft) of all yet-encoded MBs with a sequence of this MB as i and a formula of Cbouns[i]=Cbalance/Nmbleft;

(f4) Obtaining an aggregated balance of next MB 107: An aggregated balance of next MB is obtained from previous MBs through a formula of $$Cpool[i+1] = \sum_{j=1}^{i} Cbonus[j] = Cpool[i] + Cbalance/Nmbleft,$$

which is further expressed as Cpool=Cpool+Cbalance/Nmbleft.

(f5) Setting new Cmb 108: If a maximum complexity of all the MBs (Cmbs) is evenly allocated, the Cmb is set with an average MB complexity (Cmba) plus Cpool through a formula of Cmb=Cmba+Cpool. If the Cmbs is allocated through weight of SAD0, the Cmb is set as a default complexity of the $(i+1)^{st}$ MB (Cmbb[i+1]) plus Cpool through a formula of Cmb=Cmbb[i+1]+Cpool.

Because the complexity of ME used may differ very much between MBs, the complexity of the ME can be flexibly adjusted by using this method to control the complexity below a limit.

Figure 11:
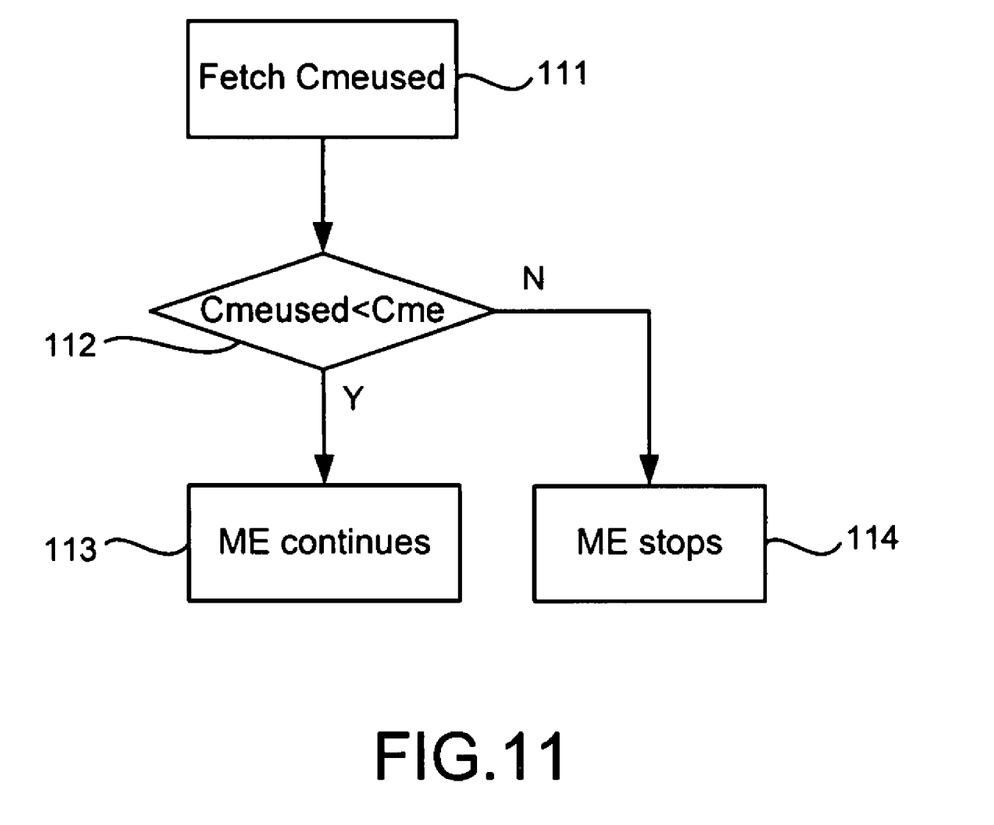
FIG. 11 is the flow view showing the complexity check.

Please refer to FIG. 11, which is a flow view showing a complexity check. As shown in the figure, after finishing the low, middle and high level ME, a complexity check process is executed. At first, (g1) a used complexity of ME (Cmeused) is fetched 111 to check if the Cmeused is smaller than an allocated complexity of the ME (Cme) 112. (g2) If Cmeused is smaller than Cme, ME continues 113; and (g3), if not, ME stops 114.

To sum up, the present invention is a method of controlling a complexity for a video compressor, where a delay jitter on compressing frames is eliminated; complexity is controlled according to power management or compression time requirement; and thus a video compressor obtains a real-time compression with a constant frame rate.

The preferred embodiment herein disclosed is not intended to unnecessarily limit the scope of the invention. Therefore, simple modifications or variations belonging to the equivalent of the scope of the claims and the instructions disclosed herein for a patent are all within the scope of the present invention.

What is claimed is:

1. A method of controlling a complexity for a video compressor, comprising steps of:
    (a1) processing a complexity analysis to a video compression system to obtain coding gains of compression tools in said video compression system separately;
    (a2) arranging a flow of motion estimation (ME) of every macro block (MB) with a result of said complexity analysis, said arranging sorting said compression tools from one having a high coding gain to one having a low coding gain;
    (a3) obtaining a best combination of a frame rate and ME levels of each frame with a maximum complexity through an iteration method;
    (a4) allocating said maximum complexity of said frame to each MB; and
    (a5) checking said allocated complexity after obtaining said ME levels and continuing processing next ME levels on obtaining said allocated complexity not smaller than used complexity,
    wherein said method has systems comprising:
    a compression tool complexity analysis system, said compression tool complexity analysis system testing said video compression system to obtain effect of each compressor of said compression tool complexity analysis system;
    an MB ME flow system, said MB ME flow system sorting said compressors of said compression tool complexity analysis system from one having a high coding rate to one having a low coding rate;
    a complexity allocation system, said complexity allocation system having processes of: allocating a maximum complexity of said frame to each MB;
    balancing complexity after encoding an MB; and allocating said balanced complexity to yet-encoded MBs;
    a complexity check system, said complexity check system checking a complexity after each ME level;
    a maximum complexity and ME levels combination system, said maximum complexity and ME levels combination system obtaining a best combination of said maximum complexity and said ME levels; and
    a delay jitter elimination system, said delay jitter elimination system controlling time of encoding said frame,
    wherein said effect of said compression tool complexity analysis system comprises increased complexities ($\Delta C$), a distortion ($\Delta D$) and a reduced rate ($\Delta R$); and
    wherein a reduced cost ($\Delta J$) is obtained by $\Delta D$ plus a product of a value $\lambda$ and said $\Delta R$ through a formula of $\Delta J = \Delta D + \lambda \Delta R$.

2. The method according to claim 1,
    wherein said video compression system is selected from a group consisting of H.264, MPEG4 and H.263.

3. The method according to claim 1,
    wherein said maximum complexity is allocated in a way selected from a group consisting of an even allocation and a weighted allocation of sum of absolute difference (SAD) to be compared with the previous frame with zero motion vector (MV) in 16×16 partition mode (SAD0)

4. The method according to claim 1,
    wherein said MB ME flow system processes said ME through steps of:
    (b1) processing a full pixel ME of a 16×16 MB partition mode;
    (b2) processing a half pixel ME of a 16×16 MB partition mode;
    (b3) processing a ¼ pixel ME of a 16×16 MB partition mode,
        wherein a minimum cost is a result of this step and a best partition mode is an inter 16×16 mode;
    (b4) processing an Intra-prediction ME of a 16×16 MB partition mode;
    (b5) if said result of step (b4) is smaller than an existing minimum cost, resetting said minimum cost with a result of step (b4) and said best partition mode with an intra 16×16 mode, and, if said result of step (b4) is not smaller than said existing minimum cost, going to step (b7);

(b6) processing an Intra-prediction ME of a 4×4 MB partition mode,
wherein, if a result of this step is smaller than said existing minimum cost, said minimum cost is reset with said result of this step and said best partition mode is reset with an intra 4×4 mode, and then ME ends;

(b7) processing a full pixel ME of an 8×8 MB partition mode;

(b8) processing a half pixel ME of an 8×8 MB partition mode;

(b9) processing a ¼ pixel ME of an 8×8 MB partition mode;
wherein, if a result of this step is smaller than said existing minimum cost, said minimum cost is reset with a result of this step and said best partition mode is reset with an inter 8×8 mode;

(b10) processing a full pixel ME of a 16×8 MB partition mode;

(b11) processing a half pixel ME of a 16×8 MB partition mode;

(b12) processing a ¼ pixel ME of a 16×8 MB partition mode,
wherein, if a result of this step is smaller than said existing minimum cost, said minimum cost is reset with said result of this step and said best partition mode is reset with an inter 8×8 mode;

(b13) processing a full pixel ME of an 8×16 MB partition mode;

(b14) processing a half pixel ME of an 8×16 MB partition mode;

(b15) processing a ¼ pixel ME of an 8×16 MB partition mode;

(b16) if said best partition mode is an inter 8×8 mode, continuing next step and, if said best partition mode is not an inter 8×8 mode, stopping ME;

(b17) processing ME of an 8×4 MB partition mode and ME of a 4×8 MB partition mode;

(b18) processing a full pixel ME of a 4×4 MB partition mode;

(b19) processing a half pixel ME of a 4×4 MB partition mode;

(b20) processing a ¼ pixel ME of a 4×4 MB partition mode; and (b21) if a result of the above step (b20) is smaller than said existing minimum cost, resetting said minimum cost with a result of the above step and said best partition mode as an inter 4×4 mode.

5. The method according to claim 1,
wherein said complexity allocation system has a process of encoding all slices of said frame, comprising steps of:
(c1) obtaining a used complexity of initialization of said frame (Cfinit) and reserving a complexity for all processes after encoding all said slices (Cfrsv);
(c2) subtracting a maximum complexity of said frame (Cfmax) with said Cfinit and said Cfrsv to obtain a maximum complexity of all said slices (Cslices) through a formula of Cslices=Cfmax−Cfinit−Cfrsv;
(c3) allocating said Cslices evenly to all slices to obtain an average slice complexity (Cslice) by dividing said Cslices by a number of said slices (Nslice) through a formula of Cslice=Cslices/Nslice;
(c4) encoding all said slices;
(c5) processing deblocking filtering and reference frame renewing,
wherein said Cfrsv is reserved to process step (c5).

6. The method according to claim 5,
wherein said complexity allocation system has a process of encoding all MBs of said slice, comprising steps of:
(d1) obtaining a used complexity of initialization of said slice (Csinit) and reserving a complexity for all processes after encoding all said MBs (Csrsv);
(d2) subtracting a maximum complexity of said slice (Cslice) with said Csinit and said Csrsv to obtain a maximum complexity of all said MBs (Cmbs) through a formula of Cmbs=Cslice−Csinit−Csrsv;
(d3) allocating said Cmbs to all MBs in a way selected from a group consisting of:
(d31) allocating said Cmbs evenly to every MB to obtain an average MB complexity (Cmba) by dividing said Cmbs by a number of said MBs (Nmb) through a formula of Cmba=Cmbs/Nmb; and
(d32) allocating said Cmbs to every MB with a weight of a sum of absolute difference (SAD) to be compared with the previous frame with zero motion vector (MV) in 16×16 partition mode (SAD0) to obtain a default complexity of each MB (Cmbb) through a formula of $$Cmbb[i] = Cmbs * \frac{SAD0[i]}{\sum_{j=1}^{M} SAD0[j]}$$

$$i = 1, 2, \ldots M;$$

(d4) obtaining a maximum complexity of the first MB (Cmb) in a way selected from a group consisting of:
(d41) if said Cmbs is evenly allocated, setting said Cmb with Cmba through a formula of Cmb=Cmba; and
(d42) if said Cmbs is allocated with said weight of SAD, setting said Cmb with a default complexity of the first MB (Cmbb[1]) through a formula of Cmb=Cmbb[1];
(d5) initializing Cpool as zero through a formula of Cpool=0;
(d6) encoding all said MBs; and
(d7) processing an ending process,
wherein said Csrsv is reserved to process step (d7).

7. The method according to claim 6,
wherein said complexity allocation system has a process of ME of said MB, comprising steps of:
(e1) obtaining a used complexity of initialization of said MB (Cmbinit) and reserving a complexity for all processes after processing said ME (Cmbrsv);
(e2) subtracting said Cmb with said Cmbinit and said Cmbrsv to obtain a maximum complexity of said ME (Cme) through a formula of Cme=Cmb−Cmbinit−Cmbrsv;
(e3) processing said ME;
(e4) processing a discrete cosine transformation (DCT) and quantification;
(e5) processing an entropy coding; and
(e6) balancing and allocating a complexity used in encoding the MB,
wherein said Cmbrsv is reserved to process step (e4) and (e5).

8. The method according to claim 7,
wherein said balancing and allocating a complexity used in encoding a MB comprises steps of:
(f1) after finishing all encoding processes of said MB, fetching a complexity used in encoding said MB (Cmbused);
(f2) then subtracting said Cmbused from said Cmb to obtain a balance of said MB (Cbalance) through a formula of Cbalance=Cmb−Cmbused;
(f3) allocating Cbalance evenly to all yet-encoded MBs to obtain an allocated complexity (Cbouns[i]) to a number (Nmbleft) of all yet-encoded MBs with a sequence of said MB as i and a formula of Cbouns[i] =Cbalance/Nmbleft;
(f4) obtaining an aggregated balance of next MB from previous MBs through a formula of $$Cpool[i+1] = \sum_{j=1}^{i} Cbonus[j] = Cpool[i] + Cbalance/Nmbleft,$$

which is further expressed as Cpool=Cpool+Cbalance/Nmbleft; and
(f5) if a maximum complexity of all said MBs (Cmbs) is evenly allocated, setting said Cmb with an average MB complexity (Cmba) plus Cpool through a formula of Cmb=Cmba+Cpool, and, if said Cmbs is allocated with weight of SAD, setting said Cmb with a default complexity of the $(i+1)^{st}$ MB (Cmbb[i+1]) plus Cpool through a formula of Cmb=Cmbb[i+1]+Cpool.

9. The method according to claim 7,
wherein said process of ME further comprises a complexity check, comprising steps of:
(g1) Fetching a used complexity of ME (Cmeused) to check if said Cmeused is smaller than an allocated complexity of ME (Cme);
(g2) Continuing ME if said Cmeused is smaller than said Cme; and
(g3) Stopping ME if said Cmeused is not smaller than said Cme.

10. The method according to claim 1,
wherein said ΔR is controlled to be zero to make ΔJ equal to ΔD.

11. The method according to claim 1,
wherein ΔJ is divided by ΔC to obtain a coding gain CG through a formula of CG=ΔJ/ΔC.

12. The method according to claim 1,
wherein said delay jitter elimination system controls a duration to be smaller than 1/f second between a time of encoding said frame and a time of encoding a previous frame.

13. A method of controlling a complexity for a video compressor, comprising steps of:
(a1) processing a complexity analysis to a video compression system to obtain coding gains of compression tools in said video compression system separately;
(a2) arranging a flow of motion estimation (ME) of every macro block (MB) with a result of said complexity analysis, said arranging sorting said compression tools from one having a high coding gain to one having a low coding gain;
(a3) obtaining a best combination of a frame rate and ME levels of each frame with a maximum complexity through an iteration method;
(a4) allocating said maximum complexity of said frame to each MB; and
(a5) checking said allocated complexity after obtaining said ME levels and continuing processing next ME levels on obtaining said allocated complexity not smaller than used complexity,
wherein said method has systems comprising:
a compression tool complexity analysis system, said compression tool complexity analysis system testing said video compression system to obtain effect of each compressor of said compression tool complexity analysis system;
an MB ME flow system, said MB ME flow system sorting said compressors of said compression tool complexity analysis system from one having a high coding rate to one having a low coding rate;
a complexity allocation system, said complexity allocation system having processes of: allocating a maximum complexity of said frame to each MB;
balancing complexity after encoding an MB; and allocating said balanced complexity to yet-encoded MBs;
a complexity check system, said complexity check system checking a complexity after each ME level;
a maximum complexity and ME levels combination system, said maximum complexity and ME levels combination system obtaining a best combination of said maximum complexity and said ME levels; and
a delay jitter elimination system, said delay jitter elimination system controlling time of encoding said frame,
wherein said complexity allocation system has a process of encoding all slices of said frame, comprising steps of:
(c1) obtaining a used complexity of initialization of said frame (Cfinit) and reserving a complexity for all processes after encoding all said slices (Cfrsv);
(c2) subtracting a maximum complexity of said frame (Cfmax) with said Cfinit and said Cfrsv to obtain a maximum complexity of all said slices (Cslices) through a formula of Cslices=Cfmax−Cfinit−Cfrsv;
(c3) allocating said Cslices evenly to all slices to obtain an average slice complexity (Cslice) by dividing said Cslices by a number of said slices (Nslice) through a formula of Cslice=Cslices/Nslice;
(c4) encoding all said slices;
(c5) processing deblocking filtering and reference frame renewing, wherein said Cfrsv is reserved to process step (c5).

* * * * *